United States Patent [19]

Yamashita et al.

[11] Patent Number: 4,552,417
[45] Date of Patent: Nov. 12, 1985

[54] POLYGONAL TYPE OPTICAL DEFLECTOR

[75] Inventors: Mitsuo Yamashita, Yokohama; Goro Oda, Sagamihara; Kiyoshi Tomimori, Yokohama, all of Japan

[73] Assignee: Tokyo Shibaura Denki Kabushiki Kaisha, Kawasaki, Japan

[21] Appl. No.: 513,795

[22] Filed: Jul. 14, 1983

[30] Foreign Application Priority Data

Jul. 20, 1982 [JP] Japan .............................. 57-126123

[51] Int. Cl.[4] ............................................. F16C 39/06
[52] U.S. Cl. ......................................... 308/10; 310/90
[58] Field of Search ...................... 308/10; 310/36, 90; 350/6.5

[56] References Cited

U.S. PATENT DOCUMENTS

| | | | |
|---|---|---|---|
| 3,004,180 | 10/1961 | Macks | 310/90 |
| 4,043,612 | 8/1977 | Orcutt | 308/10 X |
| 4,187,452 | 2/1980 | Knappe et al. | 310/36 X |
| 4,332,428 | 6/1981 | Maruyama | 308/10 |
| 4,443,043 | 4/1984 | Yamaguchi | 308/10 |

Primary Examiner—Donovan F. Duggan
Attorney, Agent, or Firm—Cushman, Darby and Cushman

[57] ABSTRACT

In an electric motor unit, a fixed shaft extends within a motor housing. A plurality of parallel grooves are formed on the outer surface of the shaft, said grooves extending in parallel with the axis of the shaft. The shaft is detachably inserted into a hollow cylindrical spindle having a smooth inner surface such that a gap is provided between the outer surface of the shaft and the inner surface of the spindle. A dynamic pressure type radial bearing is formed by the grooved outer surface of the shaft and the smooth inner surface of the spindle to support the spindle in the radial direction. Stator ring magnets are fixed to the motor housing, with rotor ring magnets being fixed to the hollow cylindrical spindle. The inner surfaces of the stator ring magnets face the outer surfaces of the rotor ring magnets. These magnets are magnetized such that the mutually facing regions have opposite magnetic poles. The stator and rotor magnets form a magnetic thrust bearing; that is, the spindle is suspended by the attractive force generated between the magnets.

3 Claims, 6 Drawing Figures

POLYGONAL TYPE OPTICAL DEFLECTOR

BACKGROUND OF THE INVENTION

This invention relates to an electric motor unit, and more specifically, to an electric motor unit for rotating a polygonal mirror.

In general, a polygonal mirror-type optical deflector is provided with a motor unit to rotate a polygonal mirror at high speed, e.g., scores of thousands of revolutions per minute. In such a motor unit, friction between a motor shaft and bearings should be minimized for high-speed rotation. To meet this requirement, Japanese Patent Publication No. 6854/78 teaches a motor unit of a tilting pad type. In the motor unit of the tilting pad type, the motor shaft is radially supported by journal bearings of a dynamic pressure type, and is suspended so as to be axially supported by a repulsive force produced between permanent magnets fixed individually to an end of the motor shaft and a motor housing. Having its motor shaft supported both radially and axially, this motor unit is suitable for high-speed rotation, though it has the following drawbacks. Suspended by the repulsive force between the pair of permanent magnets, the motor shaft is liable to vibrate due to external vibration or the like, as well as to become somewhat eccentric. Moreover, the arrangement of the permanent magnets along the axis of the motor shaft may lead to an increase in size of the motor unit.

The use of the motor unit involving these problems in an optical deflector of the polygonal mirror type will cause the following additional problems. Since the incidence position of a laser beam incident upon the polygonal mirror changes as the motor shaft vibrates along its axis, the width of the polygonal mirror must be sufficient. Therefore, the polygonal mirror increases in cost and weight, so that the rotatory load on the motor unit increases, and thereby reduces the starting capability of the motor unit. In a deflector designed so that the light reflecting surfaces of the polygonal mirror are at an angle to the axis of the motor shaft, the scanning rate of a laser deflected by the polygonal mirror varies as the incidence position of the laser beam is changed by the vibration of the motor shaft.

U.S. patent application Ser. No. 411,959 filed on Aug. 26, 1982 now U.S. Pat. No. 4,443,043 issued April 17, 1984, discloses a motor unit intended to solve the above-noted problems inherent in the conventional motor unit. In this U.S. Application, the motor shaft is supported by a pair of radial bearings of dynamic pressure type and by the attractive force between pairs of ring magnets. According to the magnetic thrust bearing employed in the motor unit, the motor shaft is suspended by the attractive force. Thus, the motor shaft is unlikely to vibrate even if external force is applied thereto. In addition, since the shaft and the ring magnets are coaxially arranged, enlargement of the motor unit can be prevented. However, the motor unit proposed in the U.S. Application necessitates a high assembly precision, making it necessary to allow sufficient time for processing, assembly and adjustment. Naturally, the motor unit in question is low in productivity, making it difficult to keep the manufacturing cost down. To be more specific, one of the paired radial bearings of the dynamic pressure type is fixed to the motor housing, with the other radial bearing being fixed to a cover detachably fixed to the motor housing, in order to facilitate the assembly and disassembly of the motor unit. Thus, in the assembly of the motor unit, the motor shaft and the paired radial bearings must be aligned coaxial within an error of, for example, about 5 $\mu$m. It follows that it is necessary to process the cover, housing, bearings and shaft with a sufficiently high accuracy. In addition, it is necessary to allow sufficient time for the alignment, leading to low productivity and high manufacturing cost.

The U.S. Application also discloses dynamic pressure type radial bearings comprising herringbone-shaped grooves. In general, herringbone grooves are formed to a depth of 3 to 6 $\mu$m on the shaft surface by photoetching, rolling or cutting. However, the arrangement of the grooves themselves is relatively complex, requiring a long processing time for the motor shaft. Naturally, the motor shaft manufacturing cost increases. Also, in the dynamic pressure type radial bearings comprising herringbone grooves, air is introduced through the grooves by utilizing the viscosity resistance of the air layer formed between the rotating shaft and the bearing, with the result that the rotating direction of the bearing is determined by the arrangement, i.e., inclination, of the grooves. It follows that it is necessary to determine in advance the rotating direction of the motor shaft. When it is desired to change the rotating direction from, for example, the clockwise direction to the counterclockwise direction, it is necessary to use another motor unit.

SUMMARY OF THE INVENTION

An object of the present invention is to provide an electric motor unit which permits rotating a polygonal mirror at a high speed, which can be processed, assembled and adjusted easily, and which permits optionally changing the rotating direction of the motor shaft.

According to the present invention, there is provided an electric motor unit, comprising:

a motor housing;

a fixed shaft extending within the motor housing and having a smooth outer surface;

a rotatable hollow cylindrical spindle having the cylindrical shaft coaxially and detachably inserted thereinto and having a smooth inner surface facing the outer surface of the cylindrical shaft with a gap provided therebetween;

a thrust bearing serving to suspend the hollow cylindrical spindle in its axial direction;

a motor rotor fixed to the hollow cylindrical spindle; and a motor stator fixed to the housing and serving to rotate the motor rotor.

According to the present invention, there is also provided an electric motor unit, comprising:

a motor housing;

a fixed shaft extending within the motor housing;

a rotatable hollow cylindrical spindle having the shaft coaxially and detachably inserted thereinto, the inner surface of the spindle facing the outer surface of the shaft with a gap provided therebetween;

a dynamic pressure type radial bearing consisting of a smooth plane formed on one of the inner surface of the spindle and the outer surface of the shaft and parallel grooves extending in parallel with the axis of the shaft and formed on the other of the inner surface of the spindle and the outer surface of the shaft;

a thrust bearing serving to suspend the hollow cylindrical spindle in its axial direction;

a motor rotor fixed to the hollow cylindrical spindle; and a motor stator fixed to the housing and serving to rotate the motor rotor.

DETAILED DESCRIPTION OF THE PREFERRED EMBODIMENT

Figure 1:
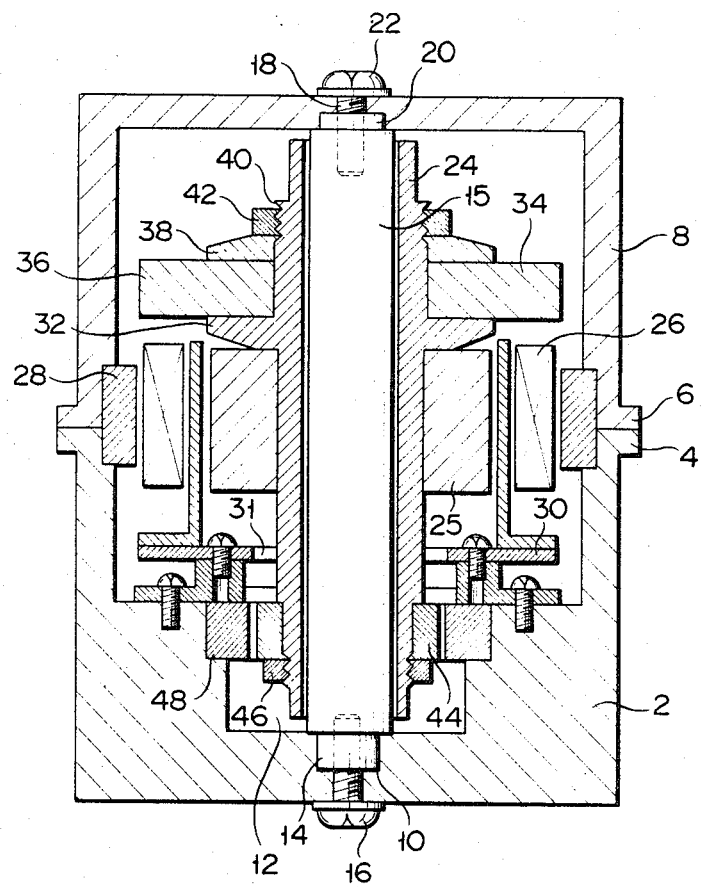
FIG. 1 is a cross-sectional view schematically showing the motor unit according to one embodiment of the present invention.

FIG. 1 shows a polygonal mirror type optical deflector provided with an electric motor unit according to one embodiment of the present invention. The motor unit comprises a cup-shaped motor housing 2 provided with a flange 4 formed along the outer circumference near the open upper end. A motor cover 8 having a flange 6 is mounted on the motor housing 2 such that the flanges 4 and 6 are brought into mutual contact. Under this condition, the motor cover 8 is fixed to the motor housing 2 by at least one screw. As a result, an air-tight vessel is formed by the motor housing 2 and the motor cover 8. Clean air is sealed in the vessel thus formed. The motor cover 8 is provided with a window (not shown) onto which a laser beam is incident and another window (not shown) from which the deflected laser beam is projected.

Figure 2:
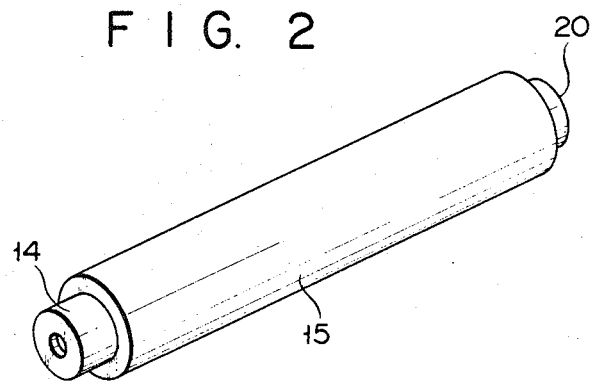
FIG. 2 is an oblique view showing the fixed shaft included in the motor unit shown in FIG. 1.

A recess 12 is formed in the bottom portion of the motor housing 2. Also, a through-hole 10 coaxial with the motor housing 2 is open to the recess 12. One end of a fixed shaft 15 shown in FIG. 2 is inserted into the through-hole 10 and securely fixed to the motor housing 2 by a stationary screw 16. The shaft 15 is coaxial with and extends within the motor housing 2. The motor cover 2 is similarly provided with a through-hole 18. The other end of the shaft 15 is inserted into the hole 18 and fixed to the motor cover 8 by a stationary screw 22.

As shown in FIG. 1, the fixed shaft 15 is inserted into a hollow cylindrical spindle 24. A gap of 3 to 6 μm is provided between the outer surface of the fixed shaft 15 and the inner surface of the hollow cylindrical spindle 24. Both the inner surface of the hollow cylindrical spindle 24 and the outer surface of the fixed shaft 15 are made smooth. In addition, these surfaces are covered with a hard film by means of explosive deposition of a ceramic material, or the spindle 24 and the shaft 15 themselves may be formed of a superhard alloy by grinding and lapping processes so as to prevent the mutual baking of the surfaces in question. It follows that the hollow cylindrical spindle 24 is rotatable about and is detachably mounted on the fixed shaft 15.

A motor rotor 25 is mounted on the central portion of the outer circumference of the spindle 24. On the other hand, a motor stator 28 provided with a driving coil 26 to surround the motor rotor 25 is mounted securely to that portion of the inner surface of the motor housing 2 which faces the outer surface of the motor rotor 25. A circuit board 30 provided with a hole 31, which serves to supply a driving current to the driving coil 26, is mounted within the motor housing 2. The spindle 24 is provided with a flange section 32 located above the motor rotor 25. A polygonal mirror 34 is mounted on the flange section 32 such that the reflective surfaces 36 of the mirror 34 are parallel with the axis of the fixed shaft 15. It is seen that the hollow cylindrical spindle 24 is inserted into the through-hole made along the axis of the polygonal mirror 34. Also, the lower surface of the polygonal mirror 34 is in contact with the upper surface of the flange section 32. The spindle 24 is further inserted into the through-hole made in a pressing disk 38, and the disk 38 is superposed on the upper surface of the polygonal mirror 34. A nut 42 is inserted into a screw portion 40 of the spindle 24. The polygonal mirror 34 is held between the flange section 32 and the pressing disk 38 by fastening the nut 42, thereby securely fixing the polygonal mirror 34 to the spindle 24. If the polygonal mirror 34 is fixed, one of the reflective surfaces of the mirror 34 faces the laser beam incident window (not shown) and projecting window (not shown).

The hollow cylindrical spindle 24 is provided at the lower outer surface with rotor ring magnets 44 to form a magnetic thrust bearing. The ring magnets 44 are fixed to the spindle 24 by a stopper ring 46. The rotor ring magnets 44 are coaxial with the fixed shaft 15 and arranged within the recess 12. On the other hand, stator ring magnets 48 are fixed to the inner surface of the motor housing 2 defining the recess 12. The rotor and stator ring magnets 44, 48 are coaxially arranged, with a gap provided therebetween, and magnetized such that the mutually facing regions have opposite magnetic poles. In order to allow the spindle 24 to be mounted on or detached from the fixed shaft 15, with the rotor ring magnets 44 kept attached to the hollow cylindrical spindle 24, the inner diameter of the hole 31 of the circuit board 30 is made larger than the outer diameter of the ring magnet 44.

In the polygonal mirror type optical deflector described above, the hollow cylindrical spindle 24 is suspended even when it is not rotating by the magnetic thrust bearing consisting of the rotor and stator ring magnets 44 and 48. Thus, if a driving current is supplied to the driving coil 26 to rotate the motor rotor 25, the spindle 24 can be easily rotated even by a low rotary torque. In addition, the spindle 24 can be rotated at high speed in any direction, because the inner surface of the hollow spindle 24 and the outer surface of the fixed shaft 15 are made smooth and collectively constitute a radial bearing. If the polygonal mirror 34 is rotated at a constant speed together with the spindle 24, the incident laser beam is deflected so as to be projected via an fθ lens (not shown) onto a photosensitive surface, which is scanned by the laser beam.

In the optical deflector described above, the hollow spindle 24 is detachably mounted on a single shaft 15 such that a radial bearing is formed by the mutually facing surfaces of the spindle 24 and the shaft 15, unlike the prior art in which separate members are provided with a pair of bearing sections. Thus, the hollow spindle 24 and the shaft 15 can be easily mounted coaxially, making it possible to prevent alignment errors in the steps of assembling and disassembling the apparatus. To be more specific, it is possible to adjust the dynamic balance in assembling the optical deflector, with the motor rotor 24 and the ring magnet 44, the polygonal mirror 34, etc. kept mounted on the hollow cylindrical spindle 24. It is also possible to mount the spindle 24 on the fixed shaft 15 without removing the motor rotor 25, etc. from the spindle 24. It follows that an error in the dynamic balance will not take place in assembling the optical deflector, making it unnecessary to perform minute adjustments.

FIGS. 3 to 6 show electric motor units according to other embodiments of the present invention. Throughout FIGS. 1 to 6, the same reference numbers denote the same members.

Figure 3:
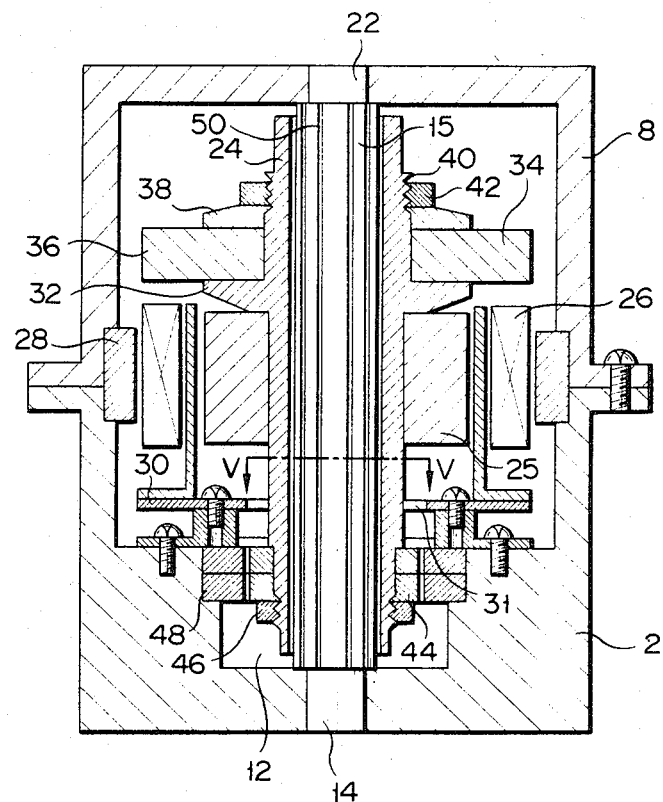
FIG. 3 is a cross-sectional view schematically showing the motor unit according to another embodiment of the present invention.
Figure 4:
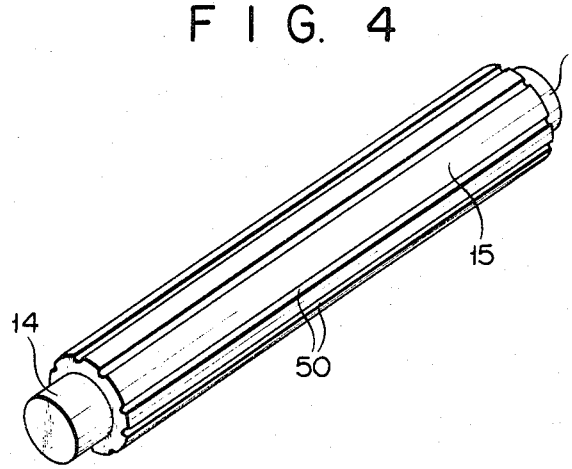
FIG. 4 is an oblique view showing the fixed shaft included in the motor unit shown in FIG. 3.
Figure 5:
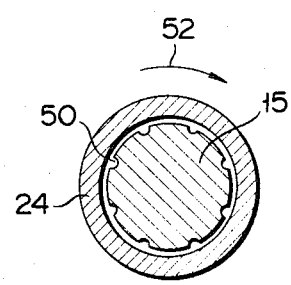
FIG. 5 is a cross-sectional view along line V—V of FIG. 3.

In the embodiment of FIGS. 3 to 5, a plurality of parallel grooves 50 are formed on the outer surface of the fixed shaft 15. The grooves 50 extend in the axial direction of the shaft 15 and have an arcuate cross section. A gap of 3 to 6 $\mu$m is provided between the groove 50 and the smooth inner surface of the hollow cylindrical spindle 24, with the result that a dynamic pressure type radial bearing is formed by the mutually facing surfaces of the shaft 15 and the spindle 24. If the spindle 24, supported by the thrust bearing, begins to rotate in the clockwise direction as denoted by an arrow 52 in FIG. 5, an air stream is formed within the gap between the spindle 24 and the fixed shaft 15, because the grooves 50 are formed on the outer surface of the shaft 15. As a result, the air pressure is elevated within the gap mentioned above so as to support the spindle 24 in the radial direction. Since the grooves 50 are parallel with the axis of the shaft 15, the spindle 24 can be supported in the radial direction whether the spindle is rotated in the clockwise or counterclockwise direction.

Figure 6:
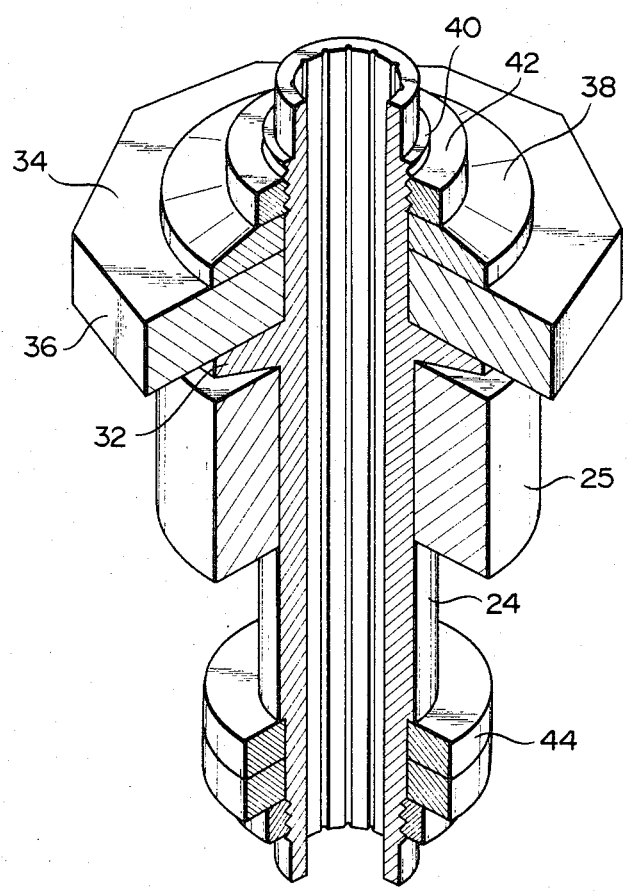
FIG. 6 is an oblique view, partly broken away, of the rotatable hollow cylindrical spindle included in the motor unit according to still another embodiment of the present invention.

In the embodiment of FIG. 6, a plurality of parallel grooves are formed on the inner surface of the hollow cylindrical spindle 24, with the outer surface of the shaft 15 being made smooth. Of course, the grooves mentioned are parallel with the axis of the spindle 24, and a small gap is provided between the inner surface of the spindle 24 and the outer surface of the shaft 15. If the spindle 24 is rotated, an air layer is formed between the spindle 24 and the shaft 15, thereby supporting the spindle 24. In the embodiment described above, the grooves 50 extend over substantially the entire length of the fixed shaft 15 or the spindle 24. However, the grooves may be formed on both end portions of the fixed shaft 15 or the spindle 24 and the smooth surface is defined between both end portions of the fixed shaft 15 or the spindle 24.

In the embodiments of FIGS. 3 to 6, the fixed shaft 15 may be provided by applying a hardening treatment to the surface of a stainless steel rod. In the embodiment of FIGS. 3 to 5, the grooves 50 are formed on the surface of the shaft 15 by photoetching, rolling, or the like. Alternatively, the grooves may be formed by extrusion, drawing, etc., of a rod member. In this case, a shaft with grooves can be formed by simply cutting the rod after formation of the grooves, leading to high productivity and low manufacturing cost of the shaft 15. It is also possible to optionally choose the cross-sectional shape of the groove 50 by properly choosing the shape of the working die. For example, the groove 50 may be made rectangular or trapezoidal in cross section as well as arcuate as shown in FIG. 5.

The spindle 24 can be prepared by forming a porous hard alumina layer on the inner surface of an aluminum hollow cylinder, followed by impregnating the porous alumina layer with Teflon (trademark of fluorocarbon resin produced by Dupont Inc., USA) by means of a Tafram treatment (trademark used by General Magnaplate Corp., USA).

In the embodiment of FIG. 1, both ends of the fixed shaft 15 are fastened to the motor housing 2 and the cover 8 by screws. However, either the upper or lower mounting portions 14 and 20 of the fixed shaft 15 may be fixed to the motor housing 2 or the cover 8 by means of, for example, shrink fitting.

Further, the motor unit of the present invention is used for rotatably supporting the polygonal mirror in the embodiments shown in the drawings. Of course, the motor unit of the present invention can be used for rotatably supporting other rotatable members.

The present invention can be modified in various other fashions.

As described above in detail, the hollow cylindrical spindle 24 is detachably mounted on a single shaft 15 in the present invention such that the mutually facing surfaces of the spindle 24 and the shaft 15 form a radial bearing, unlike the prior art in which separate members are provided with a pair of bearing sections. Thus, the hollow spindle 24 and the shaft 15 can be easily coaxially arranged, rendering it possible to prevent errors of alignment in the steps of assembling and disassembling the apparatus. Of course, the productivity and maintenance of the motor unit can be markedly improved, leading to a reduction in both the manufacturing cost and running cost of the motor unit. Needless to say, a polygonal mirror or the like can be stably rotated at high speed by the motor unit of the present invention. What should also be noted is that the rotating direction of the spindle can be freely changed, because herringbone-shaped grooves are not employed in the present invention.

What is claimed is:
1. A polygonal type optical deflector, comprising:
   a motor housing;
   a fixed shaft extending within the motor housing;
   a rotatable hollow cylindrical spindle into which the shaft is coaxially and detachably inserted, the inner surface of the spindle facing the outer surface of the shaft with a gap provided therebetween;
   a polygonal mirror fixed to the hollow cylindrical spindle and rotatable together with the spindle.
   a dynamic pressure type radial bearing consisting of a smooth plane formed on one of the inner surface of the spindle and the outer surface of the shaft and parallel straight grooves extending in parallel with the axis of the shaft and formed on the other of the inner surface of the spindle and the outer surface of the shaft;
   a magnetic thrust bearing for suspending the hollow cylindrical spindle in its axial direction;
   a motor rotor fixed to the hollow cylindrical spindle; and
   a motor stator fixed to the housing for rotating the motor rotor.
2. A deflector according to claim 1, wherein the magnetic thrust bearing includes at least one rotor ring magnet fixed to the outer surface of the hollow cylindrical spindle and having a magnetic pole on the outer surface, and a stator ring magnet fixed to the motor housing and having the opposite magnetic pole, the inner surface of the stator ring magnet facing the outer surface of the rotor ring magnet.
3. A deflector according to claim 1, which further comprises a motor cover hermetically covering the motor housing.

* * * * *